(12) United States Patent
Walker

(10) Patent No.: US 12,447,888 B2
(45) Date of Patent: Oct. 21, 2025

(54) TRAILER

(71) Applicant: TOTAL TRAILER MANUFACTURERS PTY LTD, Welshpool (AU)

(72) Inventor: Paul Joseph Walker, Welshpool (AU)

(73) Assignee: Total Trailer Manufacturers Pty Ltd, Welshpool (AU)

( * ) Notice: Subject to any disclaimer, the term of this patent is extended or adjusted under 35 U.S.C. 154(b) by 249 days.

(21) Appl. No.: 18/018,641

(22) PCT Filed: Aug. 3, 2021

(86) PCT No.: PCT/AU2021/050843
§ 371 (c)(1),
(2) Date: Jan. 30, 2023

(87) PCT Pub. No.: WO2022/027092
PCT Pub. Date: Feb. 10, 2022

(65) Prior Publication Data
US 2023/0294587 A1 Sep. 21, 2023

(30) Foreign Application Priority Data

Aug. 3, 2020 (AU) ................................ 2020902713

(51) Int. Cl.
*B60P 1/48* (2006.01)
*B60P 1/54* (2006.01)
(Continued)

(52) U.S. Cl.
CPC ............. *B60P 1/483* (2013.01); *B60P 1/5461* (2013.01); *B60P 1/549* (2013.01); *B60P 1/6427* (2013.01); *B60P 3/035* (2013.01); *B66C 23/46* (2013.01)

(58) Field of Classification Search
CPC ........... B60P 1/48; B60P 1/483; B60P 1/5428; B60P 1/5461; B60P 1/5485; B60P 1/549;
(Continued)

(56) References Cited

U.S. PATENT DOCUMENTS 2,542,425 A * 2/1951 Oliver ...................... B66F 9/08
414/544
2,708,047 A * 5/1955 Seidle ..................... B60P 1/483
414/728
(Continued)

FOREIGN PATENT DOCUMENTS

GB 2105294 A * 3/1983 ............ B60P 1/5442
GB 2201937 A * 9/1988 .............. B60P 1/483

OTHER PUBLICATIONS

International Search Report and Written Opinion of the International Search Authority issued by the Australian Patent Office for International Patent Application No. PCT/AU2021/050843 dated Sep. 2, 2021. (10 pages).
(Continued)

*Primary Examiner* — James Keenan
(74) *Attorney, Agent, or Firm* — Haynes and Boone, LLP; Randall C. Brown

(57) ABSTRACT

A trailer for lifting and positioning at least one reel thereon. The trailer includes a pair of articulated arms comprising a first elongate member and a second elongate member pivotally mounted to the first elongate member. The first elongate members are generally horizontal and movable relative to the trailer between a retracted position and a rearwardly extended position. The second elongate members are pivotable between a horizontal position in parallel alignment with the first elongate members and an upright position wherein the second elongate members are orthogonal to the first elongate members. The second elongate members are provided with respective jacks to stabilise them with respect
(Continued)

to the ground surface. A hoist to lift the reel from the support surface to an effective height greater than an effective height of a deck of the trailer is disposed between the second elongate members.

13 Claims, 11 Drawing Sheets

(51) Int. Cl.
*B60P 1/64* (2006.01)
*B60P 3/035* (2006.01)
*B66C 23/46* (2006.01)

(58) Field of Classification Search
CPC .......... B60P 3/035; B66C 23/46; B66F 9/082; B66F 9/10
USPC ................................. 212/294, 306; 414/542
See application file for complete search history.

(56) References Cited

U.S. PATENT DOCUMENTS

| | | | | |
|---|---|---|---|---|
| 2,848,123 A | | 8/1958 | Keys | |
| 3,625,380 A | | 12/1971 | Anderson | |
| 4,265,585 A | * | 5/1981 | Hawkins | B60P 1/5428 414/541 |
| 4,648,780 A | * | 3/1987 | Harms | E02F 9/166 212/304 |
| 5,028,198 A | * | 7/1991 | Buhr | B60P 1/5442 212/324 |
| 6,666,643 B1 | * | 12/2003 | Heynssens | B60P 1/4435 414/522 |
| 7,744,333 B2 | * | 6/2010 | Chaddock | B60P 1/6427 414/498 |
| 8,839,968 B2 | * | 9/2014 | Seales | B60P 1/5428 212/255 |
| 2015/0158692 A1 | | 6/2015 | Reynolds et al. | |
| 2018/0147969 A1 | | 5/2018 | Richardson | |

OTHER PUBLICATIONS

International Preliminary Report on Patentability of the International Preliminary Examining Authority issued by the Australian Patent Office for International Patent Application No. PCT/AU2021/050843 dated Jun. 10, 2022. (15 pages).

* cited by examiner

TRAILER

CROSS-REFERENCE TO RELATED APPLICATIONS

The present application is a U.S. National Stage patent application of International Patent Application No. PCT/AU2021/050843, filed Aug. 3, 2021, which claims the benefit of Australian Patent Application No. 2020902713, filed Aug. 3, 2020, the benefit of which is claimed and the disclosures of which are incorporated herein by reference in their entirety.

TECHNICAL FIELD

The disclosure relates to a trailer, in particular a trailer adapted to haul one or more reels, such as a reel carrying a belt for a conveyor system.

BACKGROUND

The discussion of the background to the disclosure is intended to facilitate an understanding of the disclosure. However, it should be appreciated that the discussion is not an acknowledgement or admission that any of the material referred to was published, known or part of the common general knowledge as at the priority date of the application.

It is common place to use a reel to transport long lengths of flexible materials, such as cables and conveyor belts. Transportation of these reels, particularly large reels, may be achieved by loading a trailer with the reel(s) and transporting them to the required destination. The trailers typically used for transportation are in the form of a low-loader. A low loader provides easy access to the deck for the loading and unloading of the reels, but also allows the reel to be positioned such that its centre of gravity is lower than if a conventional trailer was to be used. However, the use of a low loader presents logistical issues as low loaders are primarily designed to transport much heavier equipment, such as earth-moving equipment.

As the low-loaders primary task is to transport heavy equipment, the low-loader is designed to support significant weight. Naturally this results in a very robust but heavy trailer. The weight of the trailer alone can mean that the vehicle is too heavy or even too big to access certain routes. For instance, the weight of the trailer may exceed that allowed on some bridges, resulting in the truck having to take an alternate route to the destination. This can result in an excessively long trip.

Another limitation associated with using a low-loader to transport a reel(s) is that the low-loader does not have any means to load/unload the reel from the low-loader. A crane, a forklift or other lifting device is therefore required at the loading point as well as the unloading point. While this typically does not present a problem at the loading point, where the unloading point is a small and remote site the requirement of a lifting device can add considerable logistical issues and cost to the delivery.

The trailer as described herein seeks to overcome at least some of the problems described above.

SUMMARY

The disclosure provides a trailer, in particular a trailer adapted to haul one or more reels, such as a reel carrying a belt for a conveyor system.

In one aspect of the disclosure there is provided a trailer for transporting at least one reel thereon, the trailer comprising a loading means to lift and position the at least one reel from a support surface onto the trailer, the loading means comprising two articulated arms located each side of the trailer in parallel alignment therewith, each articulated arm comprising a first elongate member and a second elongate member pivotally mounted to the first elongate member, wherein the first elongate members are generally horizontal and movable relative to the trailer between a retracted position and a rearwardly extended position, and the second elongate members are pivotable between a horizontal position in parallel alignment with the first elongate member and an upright position wherein the second elongate members are orthogonal to the first elongate member, the second elongate members being provided with respective jacks to stabilise the loading means with respect to the ground surface and a hoist means disposed between the second elongate members whereby, the hoist means is operable to lift the reel from the support surface to an effective height greater than an effective height of a deck of the trailer.

When loading the trailer, the loading means may be arranged to load the at least one reel onto the trailer from a support surface proximal the trailer. When unloading the trailer, the loading means may be arranged to load the at least one reel from the trailer to a support surface proximal the trailer.

In one embodiment, a rear end of the first elongate member is provided with a coupling means adapted to engage and secure the reel when the hoist means lifts the reel from the support surface.

In one embodiment, each side of the trailer may be provided with a track or guide rail along which track or guide rail the first elongate member travels between the retracted position and the extended position.

In an alternative embodiment, each side of the trailer may be provided with a pocket configured to receive the first elongate member when in the retracted position.

In one embodiment, the jack may be operable when the second elongate member is in the upright position.

In another embodiment, the jack may be disposed proximal to the rear end of the first elongate member.

In one embodiment, the jack has a ground engaging member movable between a stowed position and an extended position, wherein in the extended position the ground engaging member engages the support surface.

In one embodiment, the trailer comprises a deck support portion which receives and supports the at least one reel.

In one embodiment, the deck support portion may be movable along a longitudinal axis of the trailer from a loading position wherein the loading means can load and unload a reel, and a stored position spaced apart from the loading position. The loading position may be proximal a rear end of the trailer and the stored position may be proximal a front end of the trailer.

In another aspect of the disclosure there is provided a haulage vehicle for transporting at least one reel thereon, the haulage vehicle comprising at least one trailer as defined above coupled with a tractor unit.

In one embodiment, the trailer may comprise a first set of wheels located proximal to the rear end of the trailer. The trailer may further comprise a second set of wheels located proximal to a forward end of the trailer.

In a further aspect of the disclosure there is provided a method for transporting at least one reel, using a haulage vehicle having at least one trailer as defined above, the method comprising:
 a) positioning the trailer and/or at least one reel relative to each other such that the reel is located proximal the rear of the trailer;
 b) activating the articulated arms of the loading means such that the first elongate members move to an extended position, the second elongate members pivot to an upright position and the ground engaging member of the jack extends to engage a support surface for the reel;
 c) operating the hoist means to engage and lift the reel greater than an effective height of a deck of the trailer; and
 d) positioning a deck of the trailer under the lifted reel by reversing the trailer, thereby moving the first elongate members to a retracted position; and
 e) operating the hoist means to lower the reel onto the deck of the trailer.

The method may further comprise activating the articulated arms of the loading means such that ground engaging member retracts to the stowed position, the second elongate member pivots to the horizontal position, and the first elongate member retracts to the retracted position.

The reel can then be secured to the trailer in a conventional manner and the trailer may now be transported to deliver the reel to a required location. When the trailer arrives at its destination, the above method is reversed to unload the reel from the trailer. The method of unloading the trailer is also covered by the scope of the present disclosure.

In embodiments where the trailer is arranged to carry more than one reel, wherein the trailer has a slidable deck support portion, the above method further comprises the steps of:
 moving the deck support portion from the loading position to the stored position once the first reel has been loaded thereon; and
 repeating steps a) to d) as defined above.

It will be appreciated that movement of the articulated arms may be substantially synchronous.

BRIEF DESCRIPTION OF DRAWINGS

Notwithstanding any other forms which may fall within the scope of the process as set forth in the Summary, specific embodiments will now be described with reference to the accompanying figures below.

In the drawings like structures are referred to by like numerals throughout the several views. The drawings shown are not necessarily to scale, with emphasis instead generally being placed upon illustrating the principles of the present invention.

DESCRIPTION OF EMBODIMENTS

Figure 1:
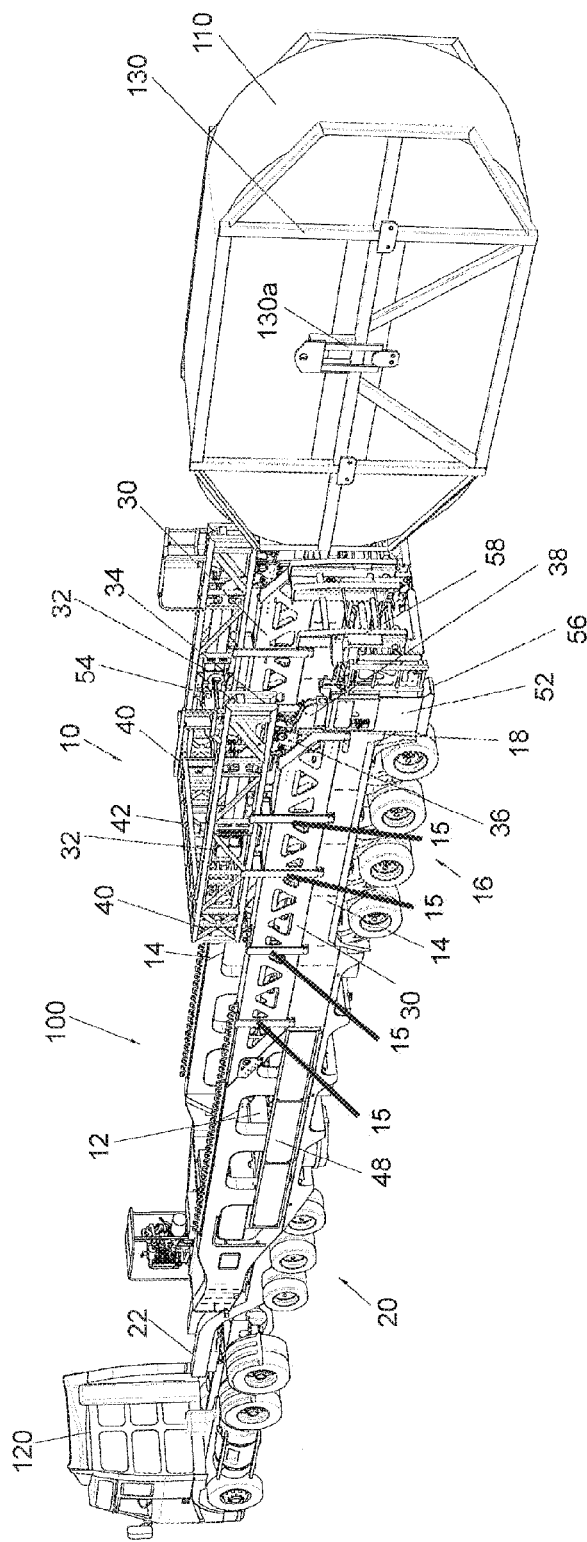
FIG. 1 is a perspective view of a trailer adapted to haul one or more reels according to one embodiment of the disclosure, wherein a reel is positioned for loading at a rear of the trailer.

The disclosure relates to a trailer, in particular a trailer adapted to haul one or more reels, such as a reel carrying a belt for a conveyor system.

General Terms

Throughout this specification, unless specifically stated otherwise or the context requires otherwise, reference to a single step, composition of matter, group of steps or group of compositions of matter shall be taken to encompass one and a plurality (i.e. one or more) of those steps, compositions of matter, groups of steps or groups of compositions of matter. Thus, as used herein, the singular forms "a", "an" and "the" include plural aspects unless the context clearly dictates otherwise. For example, reference to "a" includes a single as well as two or more; reference to "an" includes a single as well as two or more; reference to "the" includes a single as well as two or more and so forth.

Each example of the present disclosure described herein is to be applied mutatis mutandis to each and every other example unless specifically stated otherwise. The present disclosure is not to be limited in scope by the specific examples described herein, which are intended for the purpose of exemplification only. Functionally-equivalent products, compositions and methods are clearly within the scope of the disclosure as described herein.

The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.).

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Reference to positional descriptions, such as lower and upper, are to be taken in context of the embodiments depicted in the figures, and are not to be taken as limiting the invention to the literal interpretation of the term but rather as would be understood by the skilled addressee.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The term "and/or", e.g., "X and/or Y" shall be understood to mean either "X and Y" or "X or Y" and shall be taken to provide explicit support for both meanings or for either meaning.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the present specification, including definitions, will control. In addition, the materials, methods, and examples are illustrative only and not intended to be limiting.

The term "about" as used herein means within 5%, and more preferably within 1%, of a given value or range. For example, "about 3.7%" means from 3.5 to 3.9%, preferably from 3.66 to 3.74%. When the term "about" is associated with a range of values, e.g., "about X % to Y %", the term "about" is intended to modify both the lower (X) and upper (Y) values of the recited range. For example, "about 20% to 40%" is equivalent to "about 20% to about 40%".

Trailer

Referring to the figures, where like numerals refer to like parts throughout, there is shown an embodiment of a haulage vehicle 100 for transporting at least one reel 110 thereon, the haulage vehicle 100 comprising a trailer 10 coupled with a tractor unit 120.

The term 'reel' as used herein describes any reel, or similar device, such as a drum or spool, around which material, in particular elongate flexible material, may be wound. The elongate flexible material may include conveyor belts, ropes, cables, chains, wire. The term also covers a reel which does not have material wound thereabout.

Figure 2:
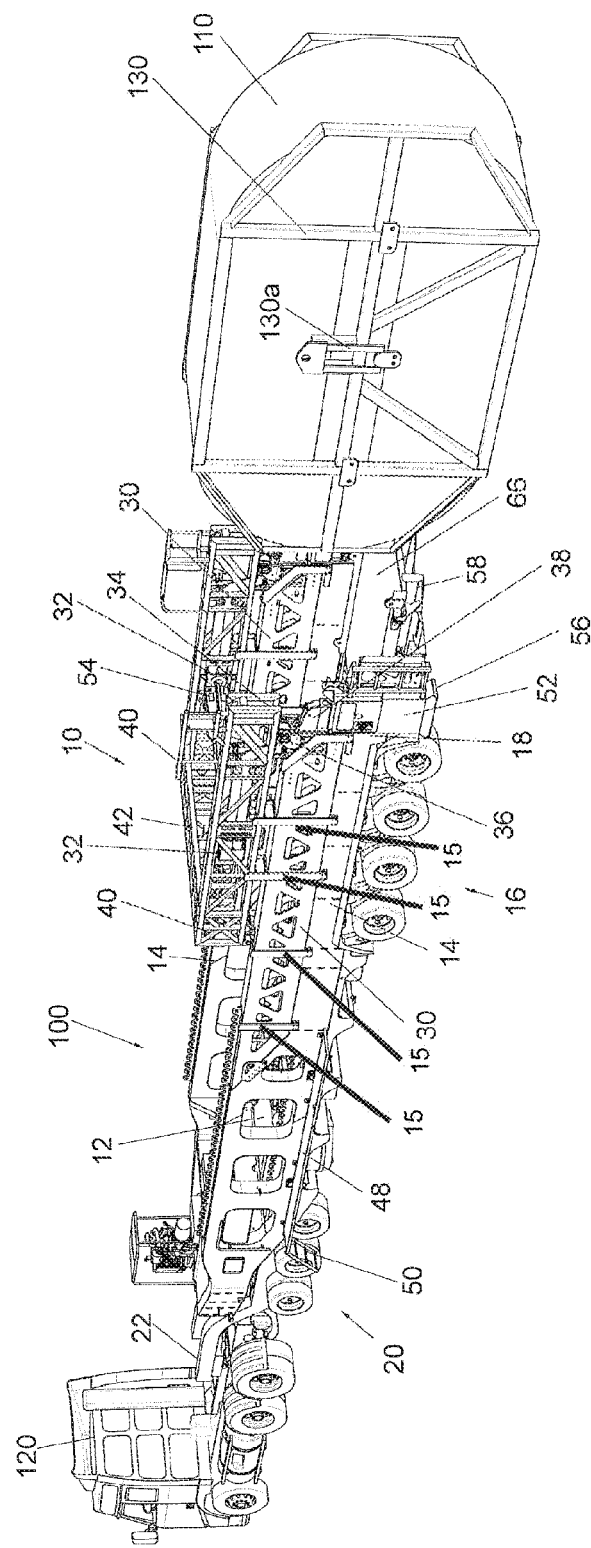
FIG. 2 is the trailer shown in FIG. 1, wherein a deck support portion is shown in a loading position, prior to loading the reel thereon.

The trailer 10 includes a deck 12 and a pair of opposing generally upright side walls 14. The side walls 14 may include one or more lightening holes to reduce the weight of the trailer. The side walls 14 may also include a walkway 48 and access steps 50. The walkway 48 comprises a plank hingedly connected at a lower side thereof to the side wall 14 and pivotable between a stowed position, as shown in FIG. 1, and an extended position, as shown in FIG. 2. The access steps 50 may be pivotable at one end of the walkway 48 between a stowed configuration, as shown in FIG. 1, and an extended configuration, as shown in FIG. 2.

The trailer 10 includes a first set of wheels 16 located proximal to a rear end 18 of the trailer 10 and a second set of wheels 20 located proximal to a forward end 22 of the trailer. It will be appreciated that in other embodiments, the second set of wheels 20 may be located in a different position. Additionally, in some embodiments, additional sets of wheels may be required.

The trailer 10 may also include a hitch arrangement at the forward end 22 to enable coupling with the tractor unit 120.

In various embodiments, the trailer 10 as described herein includes a loading means which is capable of loading and unloading one or more reels 110 from the trailer 10 without requiring additional or separate hoisting or lifting equipment.

The loading means includes two articulated arms associated with each side wall 14. Each articulated arm includes a first elongate member 30 and a second elongate member 32 pivotally mounted to the first elongate member 30. An end 34 of the second elongate member 32 is pivotally mounted at pivot 36 proximal to a rear end 38 of the first elongate member 30. Respective free ends 40 of the second elongate members 32 may be interconnected by a third elongate member 42. The first, second and third elongate members 30, 32, 42 may take the form of solid beams. Alternatively, as shown in the Figures, the first, second and third elongate members 30, 32, 42 may take the form of rigid frames.

It will be appreciated that movement of the articulated arms is substantially synchronous in embodiments wherein the second elongate members 32 are not interconnected. With respect to the articulated arms, the first elongate member 30 and the second elongate member 32 are independently positionable relative to one another, as will be described in more detail.

Figure 9:
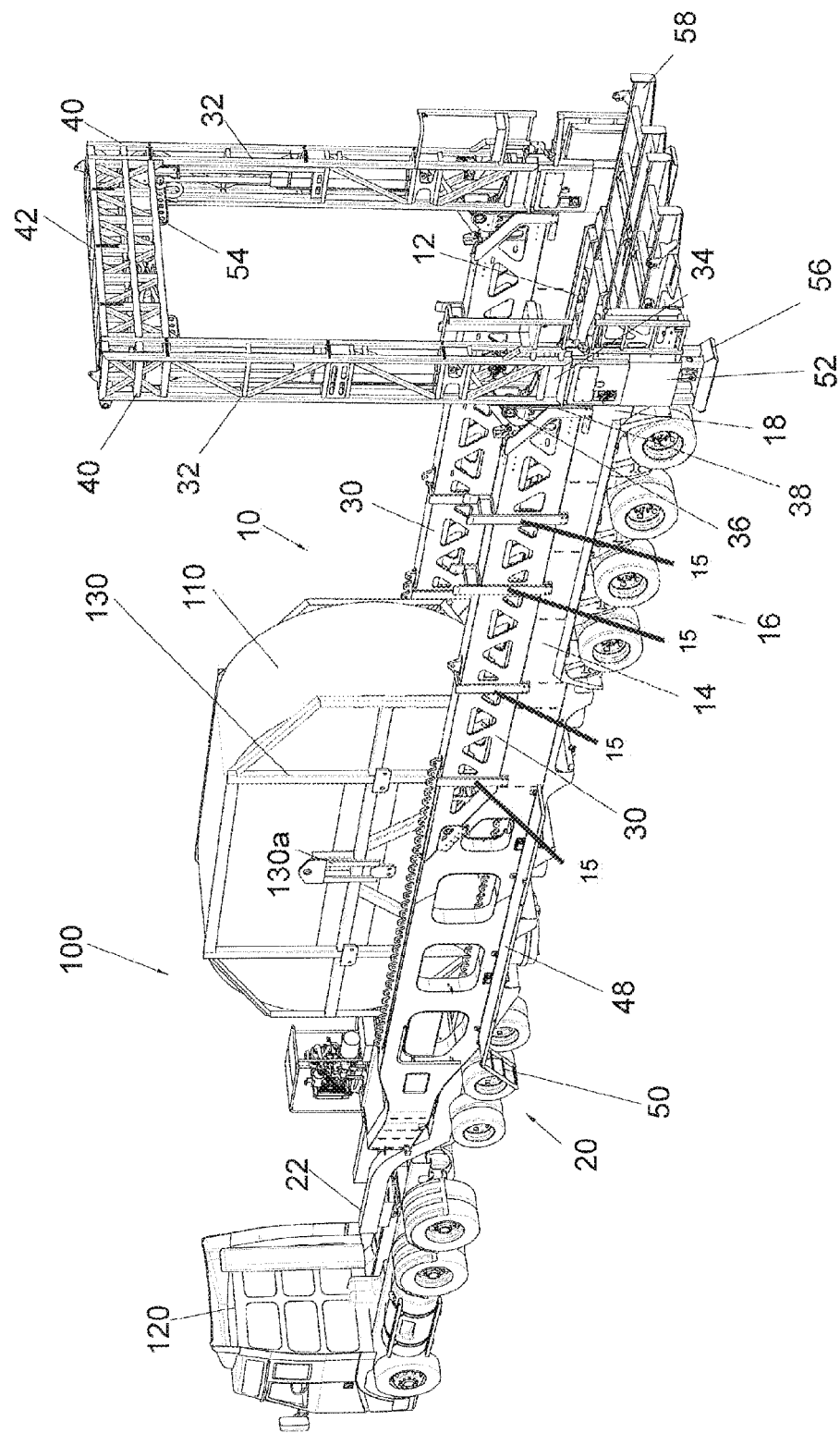
FIG. 9 is the trailer shown in the preceding figures, wherein the reel supported on the deck support portion having been conveyed to a stored position.

The first elongate member 30 is generally horizontal and disposed in parallel alignment with the side wall 14. The first elongate member 30 is movable relative to the trailer 10 between a retracted position, as shown in FIGS. 1 and 9, and an extended position wherein the first elongate member 30 extends rearwardly from the trailer 10, as shown in FIGS. 2 to 5.

The side walls 14 may be provided with a guide means to facilitate travel of the first elongate member 30 between the retracted position and the extended position. The first elongate member 30 may be hydraulically driven.

In this particular embodiment, each side wall 14 of the trailer 10 is provided with a pocket 44 configured to receive the first elongate member 30 when in the retracted position. The pocket 44 extends in longitudinal alignment with the side wall 14.

Alternatively, each side wall 14 of the trailer 10 may be provided with a track or guide rail 15 along which track or guide rail 15 the first elongate member 30 travels between the retracted position and the extended position.

The second elongate member 32 is pivotable about pivot 36 between a horizontal position, wherein the second elongate member 32 is parallel to the first elongate member 30, and an upright position wherein the second elongate member 32 is orthogonal to the first elongate member 30.

The rear end 38 of the first elongate member 30 or the end 34 of the second elongate member 32 may be provided with a coupling means (not shown) adapted to engage and secure the reel 110 when the loading means lifts the reel 110. In some embodiments, the coupling means (not shown) may be adapted to engage and secure an outer surface of a spindle of the reel 110. In other embodiments, such as shown in the Figures, the reel 110 may be provided with a frame 130 adapted for ease of handling the reel 110. In these particular embodiments, the coupling means (not shown) may be adapted to engage and secure a portion 130a of the frame 130 disposed adjacent the spindle of the reel 110.

The loading means may be provided with a gantry 54 disposed between opposing second elongate members 32 and associated with the coupling means. The gantry 54 is hydraulically operated to raise and lower the reel 110 as will be described later. It will be appreciated that the second elongate members 32 may be associated with alternative hoist means. Suitable examples of alternative hoist means include, but are not limited to, a chain hoist, lever hoist, ratchet and so forth. In use, the hoist means is operable to lift the reel 110 from the support surface.

A jack 52 is associated with the rear end 38 of the first elongate member 30 and the end 34 of the second elongate member 32. Generally, the jack 52 is operable when the second elongate member 32 is in the upright position.

The jack 52 may have a ground engaging member 56. The ground engaging member 56 is movable between a stowed position and an extended position wherein the ground engaging member 56 engages a support surface proximal to the reel 110. In this way, the loading means effectively straddles the reel 110 to stabilise the reel 110 before it is lifted.

In the embodiment shown in the Figures, the rear end 18 of the trailer 100 includes a frame 58 pivotable between an upright stowed position and an extended position. In the extended position, the frame 58 is generally co-extensive with the trailer 10 in a manner to increase the effective length of the trailer 10.

The trailer 10 may also include a deck support portion 66. The deck support portion 66 receives and supports the reel 110. The deck support portion 66 is movable along the longitudinal axis of the trailer 10 from a loading position wherein the loading means can load and unload the reel 110, and a stored position spaced apart from the loading position. The loading position may be proximal the rear end 18 of the trailer 10 and the stored position may be proximal the forward end 22 of the trailer 10. In particular, in the loading position, the deck support portion 66 may be positioned to overlie the frame 58 when in the extended position, as shown in FIG. 2.

In operation, the trailer 10 facilitates the loading, transportation and unloading of the reel 110 without requiring additional equipment.

The sequential steps of loading the reel 110 onto the trailer 10 are represented in FIGS. 1 to 11. It will be appreciated that the reverse of these steps is undertaken to unload the reel 110 from the trailer 10.

As noted in FIG. 1, the trailer 10 and the reel 110 are positioned relative to each other so that the reel 110 is at the rear of the trailer 10.

With reference to FIG. 2, the walkway 48 and access steps 50 may be positioned in their extended positions, respectively to allow safe and ready access to the side walls 14 of the trailer 10. The frame 58 is also pivoted to the extended position and the deck support portion 66 is then conveyed to the loading position overlying the frame 58 proximal the rear end 18 of the trailer 10.

Figure 3:
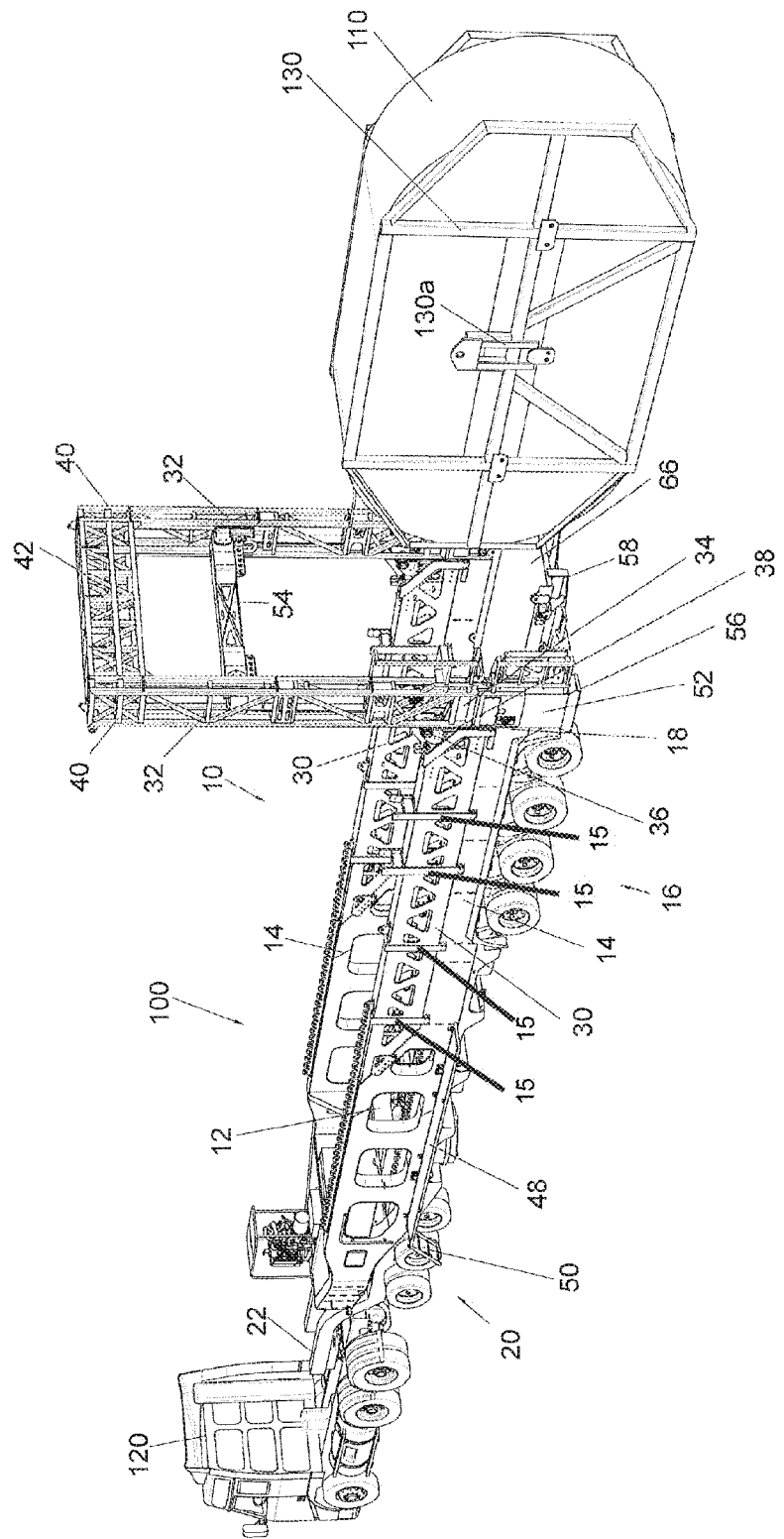
FIG. 3 is the trailer shown in the preceding figures, wherein a first elongate member of a set of articulated arms is shown in retracted position and a second elongate member of said arms is shown in an upright position.

The second elongate member 32 is caused to pivot from the horizontal position to the upright position, as shown in FIG. 3.

Figure 4:
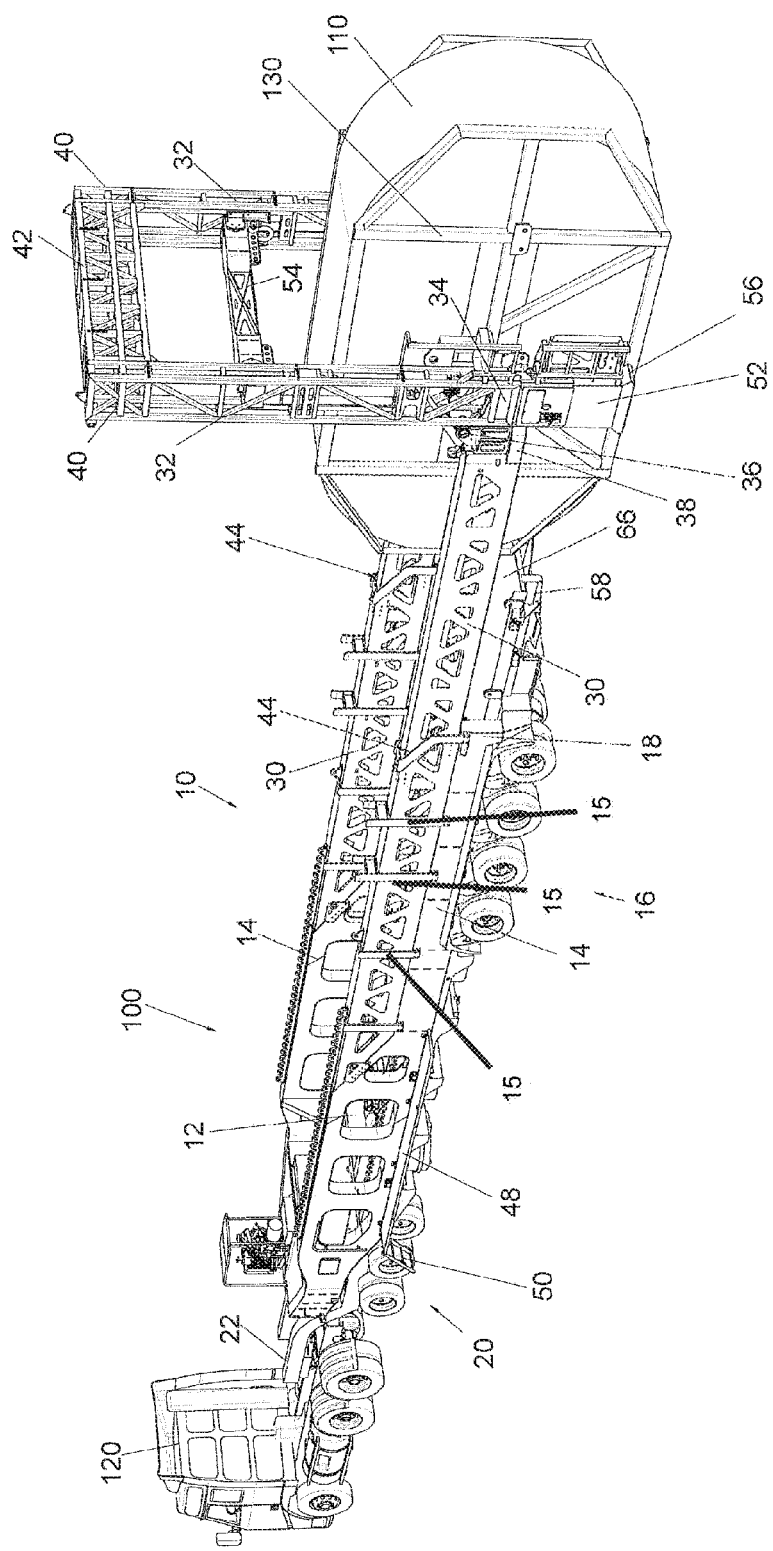
FIG. 4 is the trailer shown in the preceding figures, wherein the first elongate member of said arms is shown in an extended position.

The first elongate member 30 of the articulated arms is then caused to move rearwardly along the guide means to the extended position, as shown in FIG. 4. The coupling means (not shown) at the rear end 38 of the first elongate member 30 and the end 34 of the second elongate member 32 may engage and secure the portion 130a of the frame 130 adjacent the spindle of the reel 110.

Figure 5:
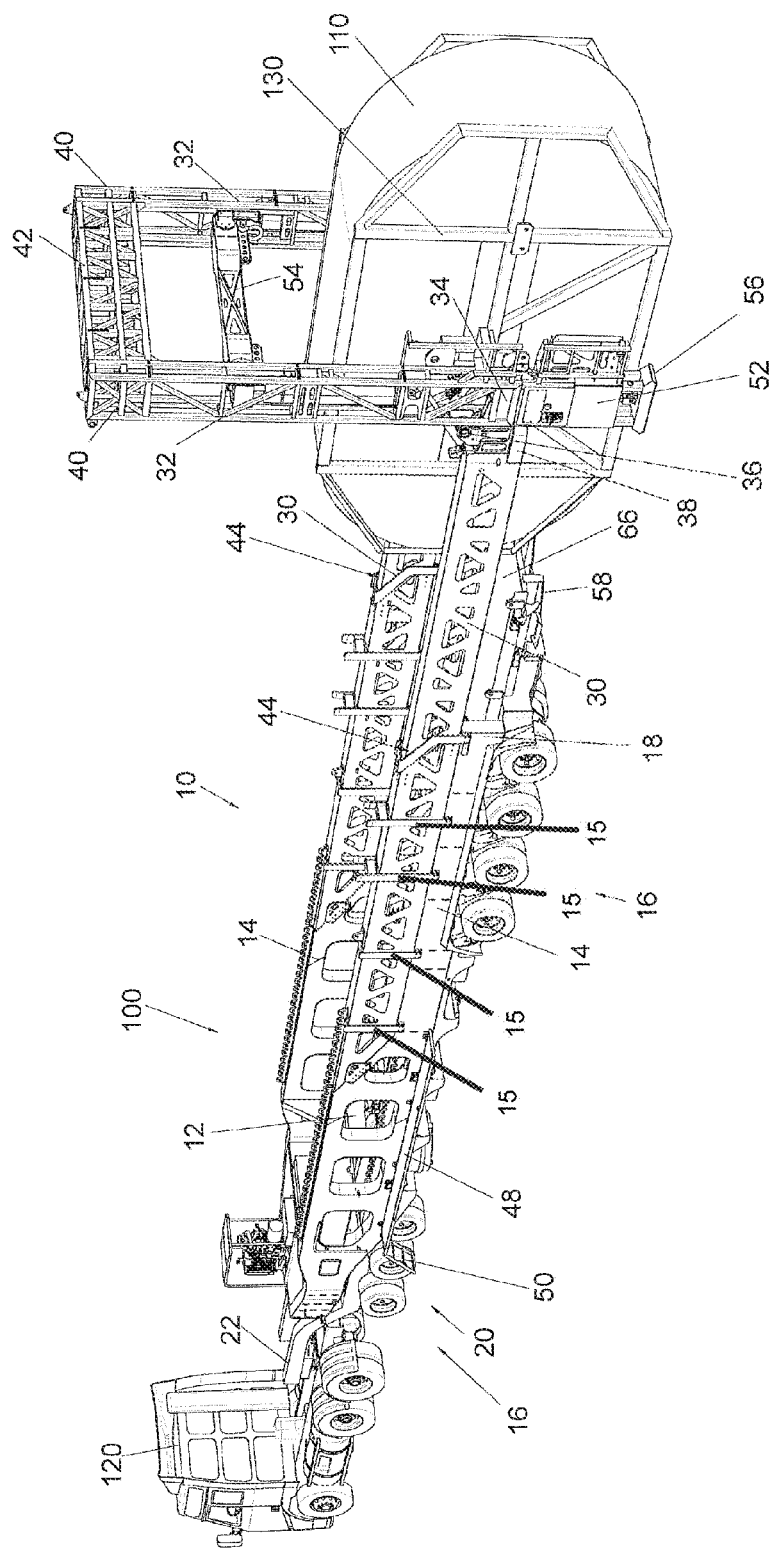
FIG. 5 is the trailer shown in the preceding figures, wherein a ground engaging member of a jack co-extensive with the second elongate member is in an extended position.

The jack 52 is then operated to move the ground engaging member 56 to the extended position to engage the support surface proximal to the reel 110, as shown in FIG. 5.

Figure 6:
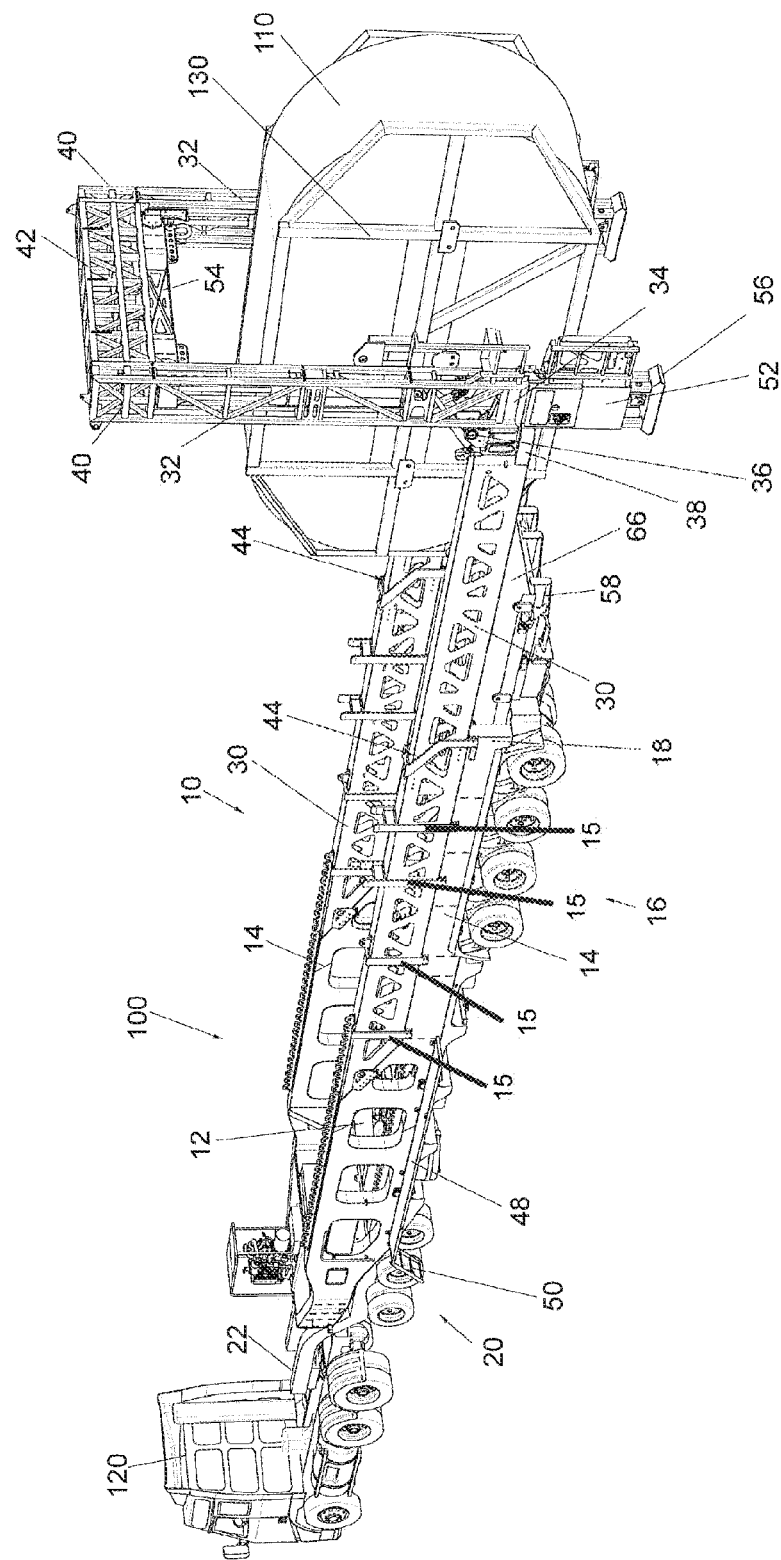
FIG. 6 is the trailer shown in the preceding figures, wherein the reel is lifted by a hoist means associated with the second elongate member.

The gantry 54 is then engaged with the frame 130 and operated to cause the reel 110 and the frame 130 to lift from the support surface. In particular, the gantry 54 lifts the reel 110 from the support surface to an effective height greater than an effective height of the deck 12 of the trailer 10, as shown in FIG. 6.

Figure 7:
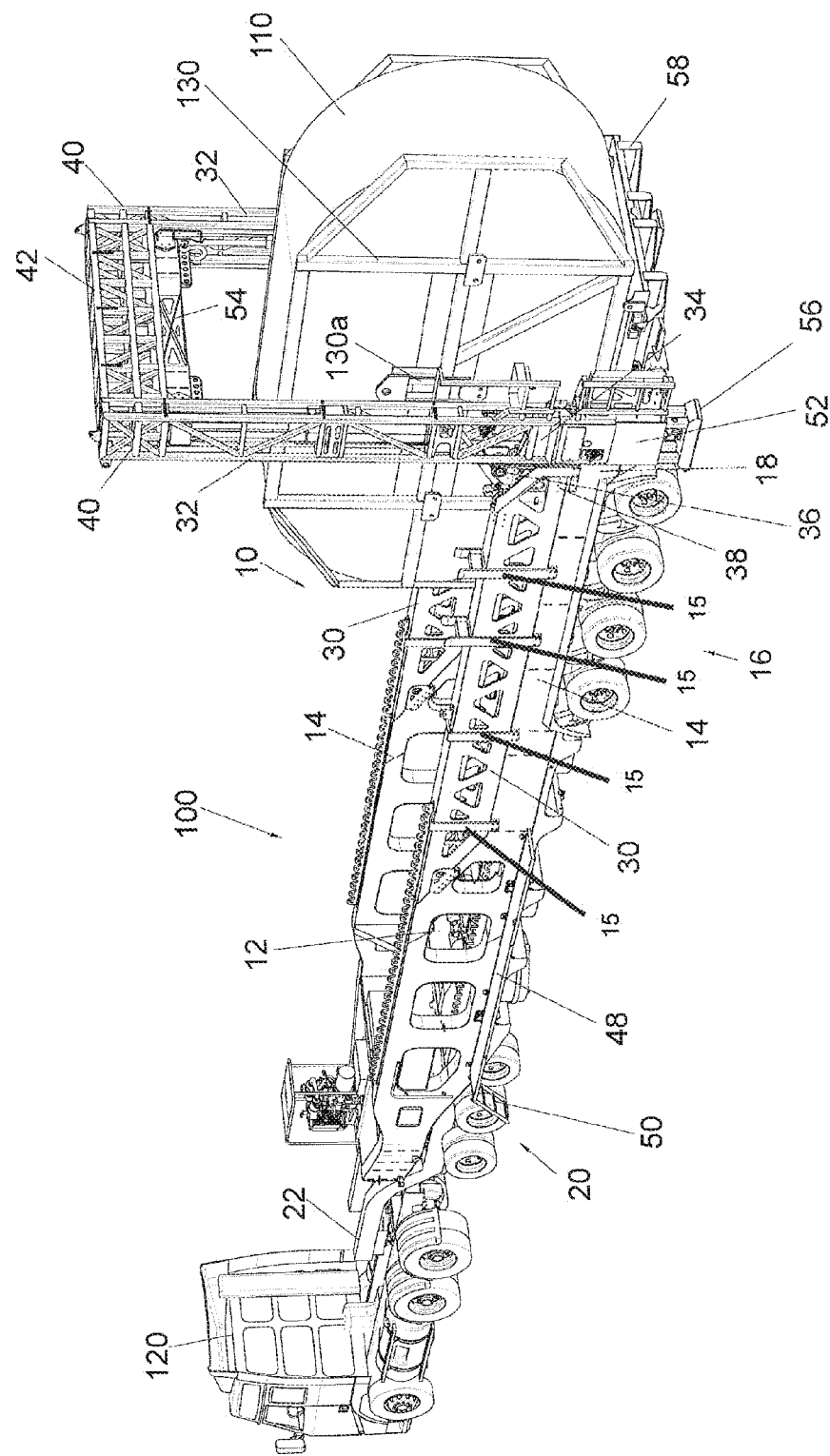
FIG. 7 is the trailer shown in the preceding figures, wherein the trailer is reversed toward the lifted reel until said reel is suspended above the deck support portion and the first elongate member is positioned in the retracted position.

The trailer 10 may then be reversed toward the lifted reel 110 for a distance sufficient for the lifted reel 110 to overlie the deck support portion 66 of deck 12 in its loading position, as shown in FIG. 7. It will be appreciated that the first elongate members 30 move into their retracted position as the trailer 10 is reversed towards the reel 110.

Figure 8:
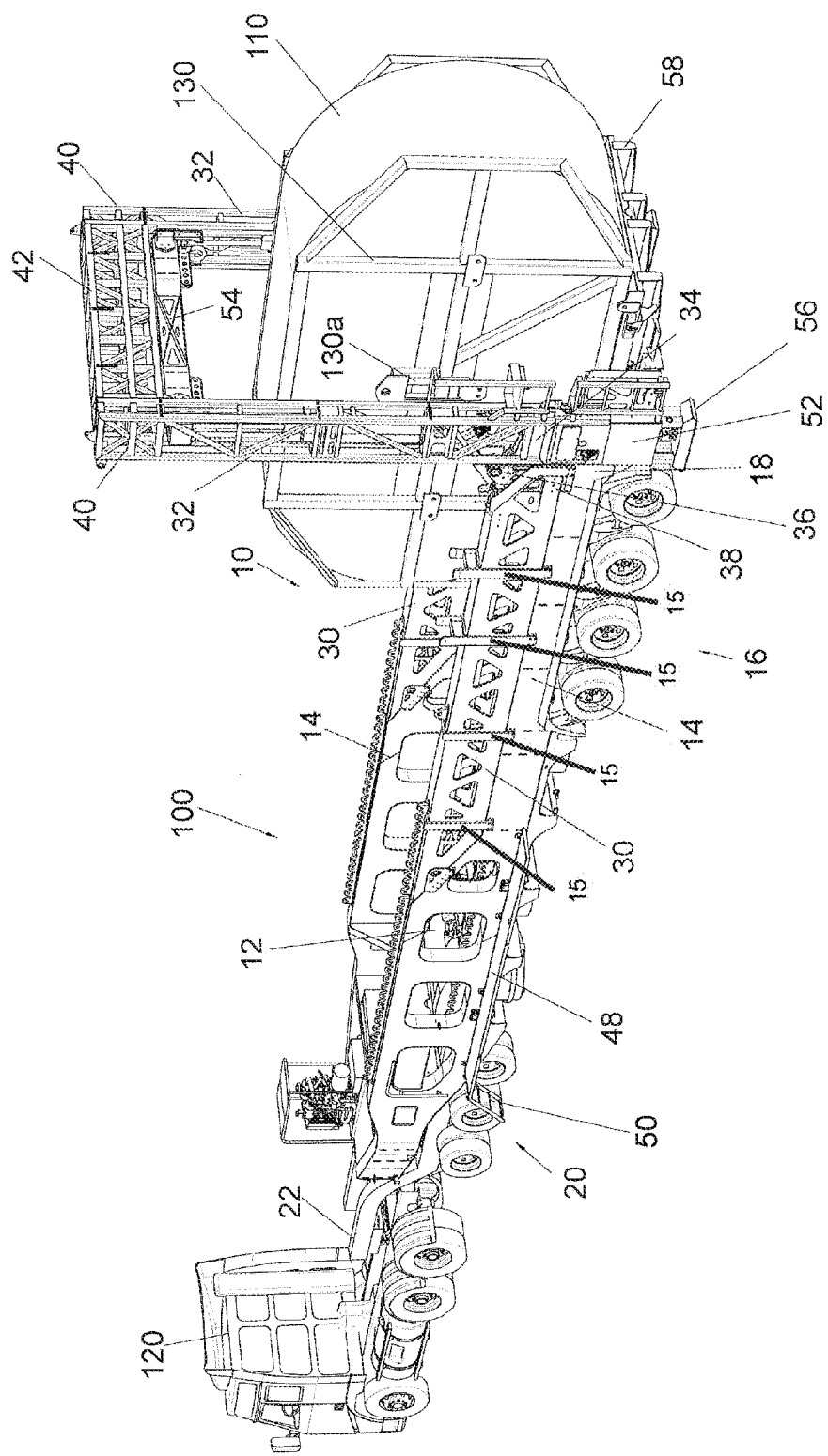
FIG. 8 is the trailer shown in the preceding figures, wherein the reel is lowered onto the deck support portion in the loading position.

The gantry 54 then lowers the reel 110 onto the underlying deck support portion 66, as shown in FIG. 8.

The deck support portion 66 is caused to move from the loading position to the stored position, as shown in FIG. 9, leaving space on the deck for a further reel 110' to be subsequently loaded if required.

Figure 10:
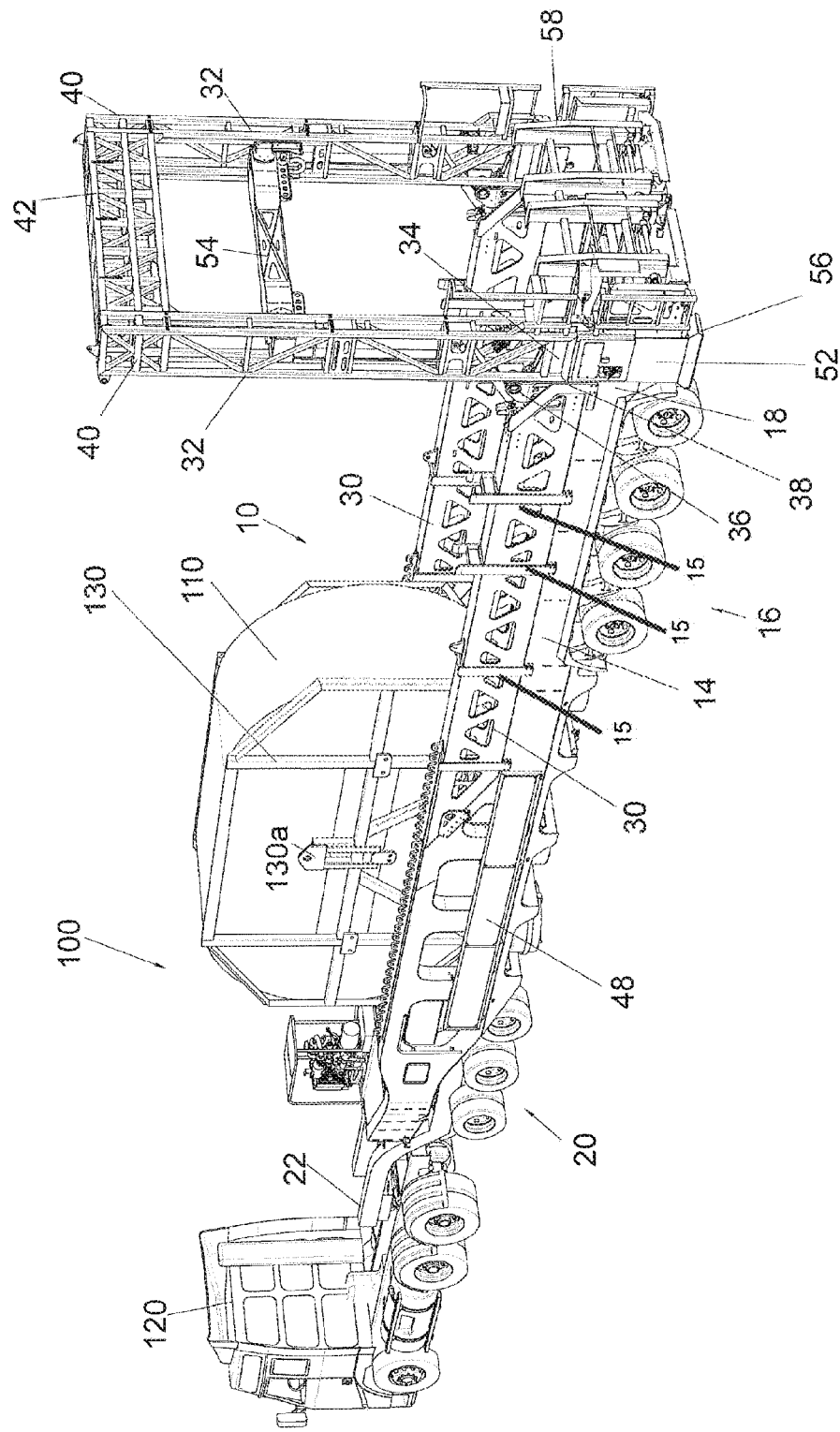
FIG. 10 is the trailer shown in the preceding figures, wherein the ground engaging member of the jack is shown in a stowed position; and, FIG. 11 is the trailer shown in the preceding figures, wherein the second elongate member is positioned in the horizontal position.
Figure 11:
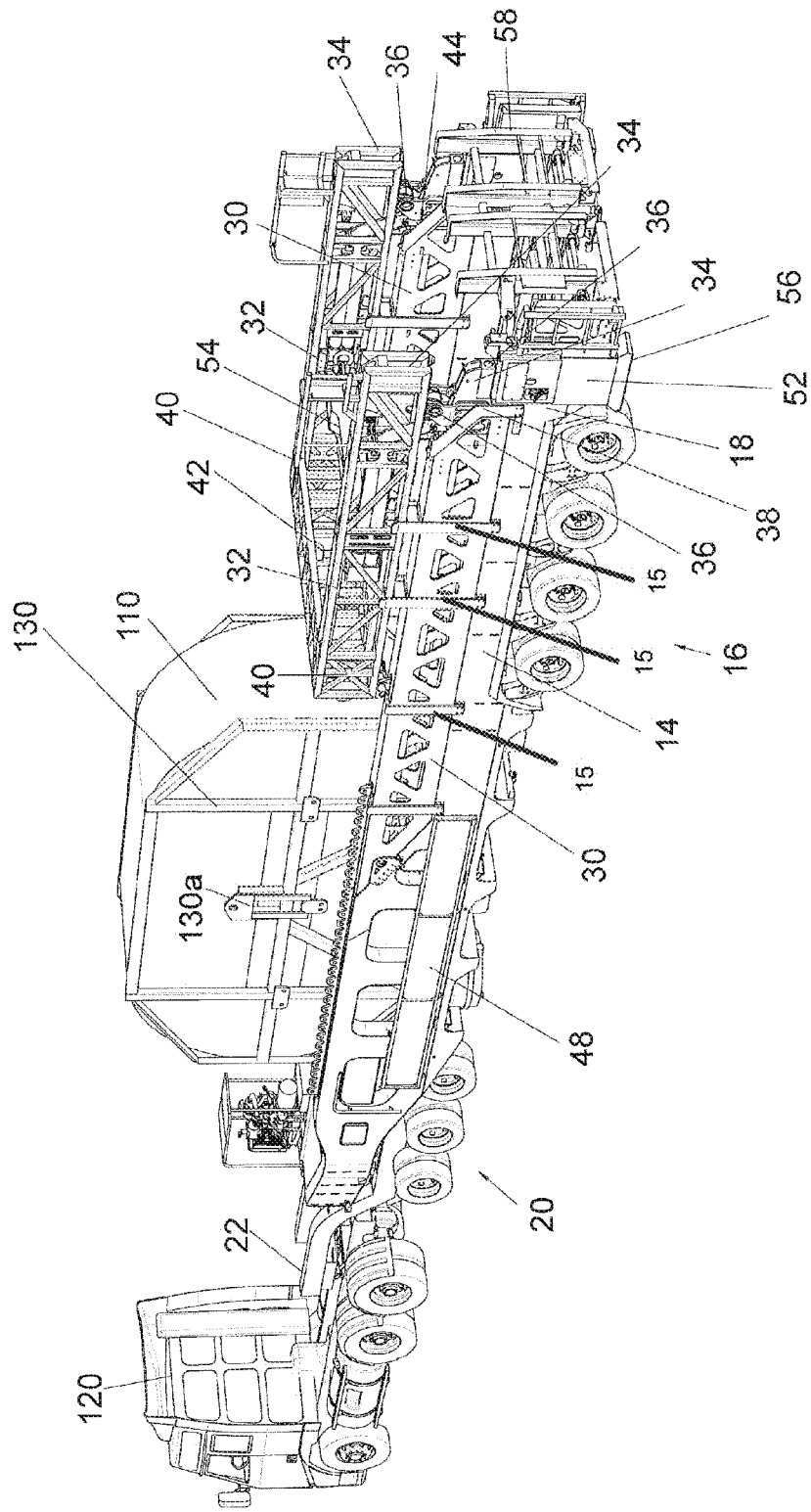

The ground engaging member 56 is caused to move from the extended position into the stowed position, as shown in FIG. 10. The access steps 50 and the walkway 48 are also moved to their respective stowed positions. Further, frame 58 is also pivoted to a stowed position. The second elongate member 32 may then be pivoted to the horizontal position, as shown in FIG. 11.

Where it is desirable for a further reel 110' to be loaded, the trailer 10 is re-positioned relative to the further reel 110' so that the further reel 110' is at the rear of the trailer 10. The further reel 110' is then loaded according to the series of steps described above.

The reel 110, and optionally the further reel 110', can then be secured to the trailer 10 in a conventional manner and the trailer 10 may now be transported to deliver the reels 110, 110' to a required location. When the trailer 10 arrives at its destination, the above method is reversed to unload reels 110, 110' from the trailer 10.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

In the claims which follow and in the preceding description except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A trailer having a forward end, a rear end, and first and second opposing side walls extending perpendicular to and between the forward and rear ends of the trailer for transporting a first reel thereon, the trailer comprising;
   a loader to lift and position the first reel from a support surface onto the trailer, the loader comprising:
      a first articulated arm located on the first side wall of the trailer; and a second articulated arm located on the second side wall of the trailer in parallel alignment therewith,
      wherein the first and second articulated arms each comprise:
         (a) a first elongate member having a first end extending toward the forward end of the trailer and a second end extending toward the rear end of the trailer; and
         (b) a second elongate member having a first end and a second end, wherein the first end of each second elongate member is pivotally directly connected to the second end of each first elongate member,
         wherein the first elongate members are parallel to the side walls of the trailer and movable relative to the trailer between a retracted position and a rearwardly extended position, and
         wherein the second elongate members are pivotable between a horizontal position in parallel alignment with the first elongate members and an upright position wherein the second elongate members are orthogonal to the first elongate members, the second elongate members each being directly connected to a jack to stabilise the loader with respect to the support surface and a hoist disposed between the second elongate members whereby, the hoist is operable to lift the first reel from the support surface to an effective height greater than an effective height of a deck of the trailer.

2. The trailer according to claim 1, wherein each of the first and second side walls of the trailer comprise a track or guide rail along which each track or guide rail a respective one of the first elongate members travels between the retracted position and the extended position.

3. The trailer according to claim 1, wherein each side of the first and second side walls of the trailer comprise a pocket configured to receive a respective one of the first elongate members when in the retracted position.

4. The trailer according to claim 1, wherein the jacks are operable when the second elongate members are in the upright position.

5. The trailer according to claim 1, wherein each jack is disposed proximal to the second end of a respective one of the first elongate members.

6. The trailer according to claim 1, wherein each jack has a ground engaging member movable between a stowed position and an extended position, wherein in the extended position the ground engaging member engages the support surface.

7. The trailer according to claim 1, wherein the trailer comprises a deck support portion which receives and supports the first reel.

8. The trailer according to claim 7, wherein the deck support portion is movable along a longitudinal axis of the trailer from a loading position wherein the loader can load and unload the first reel, and a stored position spaced apart from the loading position.

9. The trailer according to claim 8, wherein the loading position is proximal the rear end of the trailer and the stored position is proximal the forward end of the trailer.

10. A haulage vehicle comprising at least one trailer as defined in claim 1 coupled with a tractor unit.

11. A method for transporting a first reel, using a haulage vehicle having at least one trailer as defined in claim 1, the method comprising:
   a) positioning the trailer and/or the first reel relative to each other such that the first reel is located proximal the rear end of the trailer;
   b) activating the first and second articulated arms of the loader such that each of the first elongate members move to the rearwardly extended position, each of the second elongate members pivot to the upright position and a respective ground engaging member of each of the jacks extends downwardly to engage the support surface for the first reel;
   c) operating the hoist to engage and lift the first reel to an effective height greater than the effective height of the deck of the trailer;
   d) positioning the deck of the trailer under the lifted first reel, thereby moving each of the first elongate members to the retracted position; and
   e) operating the hoist to lower the first reel onto the deck of the trailer.

12. The method according to claim 11, wherein the trailer is arranged to carry the first reel and a second reel, wherein the trailer has a slidable deck support portion, the method further comprising the steps of:
   moving the deck support portion from a loading position to a stored position spaced apart from the loading position when the first reel has been lowered onto the deck of the trailer; and
   repeating steps a) to e) with the second reel.

13. The method according to claim 11, further comprising:
   disengaging each of the first elongate members from the first reel, retracting the ground engaging member of each jack to a stowed position and pivoting each of the second elongate members to the horizontal position.

* * * * *